(No Model.)
J. M. GLASSMEYER.
COOKING UTENSIL.
No. 532,729. Patented Jan. 15, 1895.
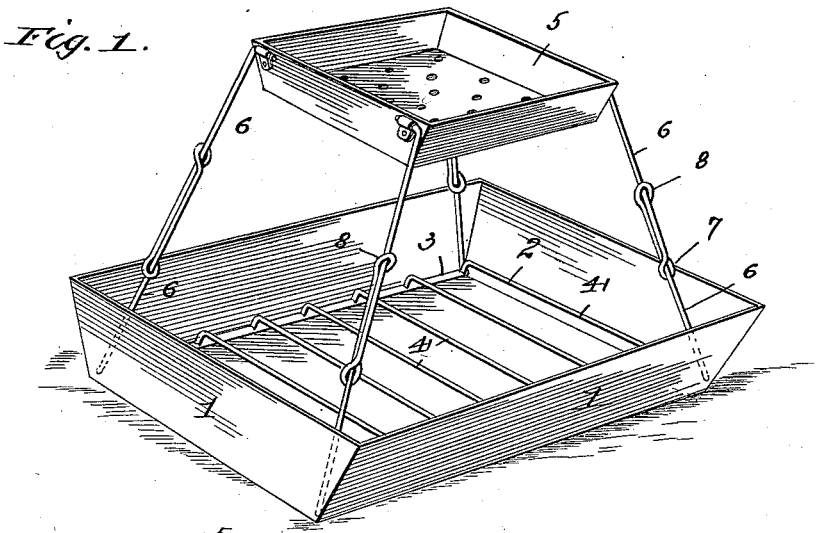
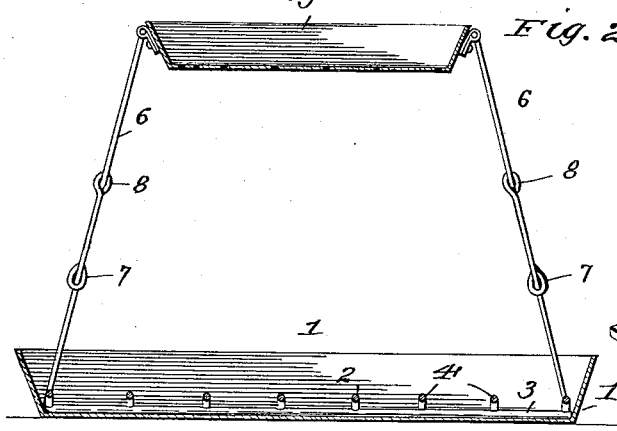
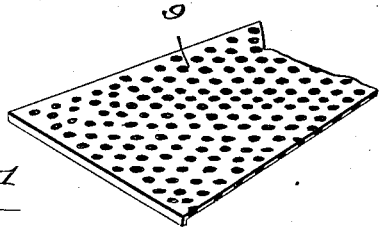
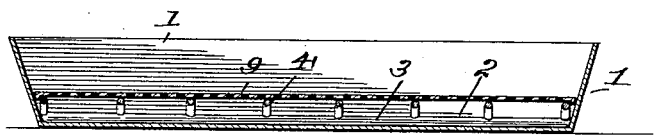
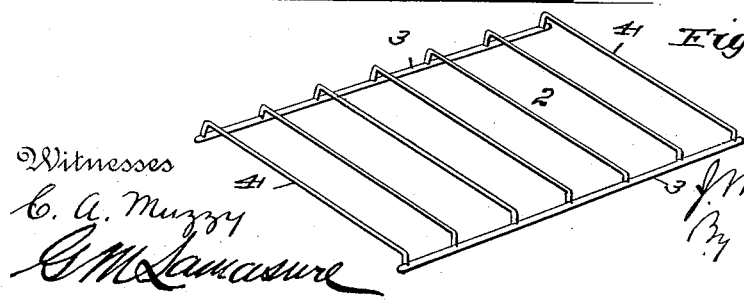
Witnesses
C. A. Muzzy
G. M. Lamasure
Inventor
J. M. Glassmeyer
By Alexander Davis
Attorneys

UNITED STATES PATENT OFFICE.

JOHN M. GLASSMEYER, OF WELLSTON, ASSIGNOR OF ONE-HALF TO FRANCIS M. CAMPBELL, OF ST. LOUIS, MISSOURI.

COOKING UTENSIL.

SPECIFICATION forming part of Letters Patent No. 532,729, dated January 15, 1895.

Application filed September 24, 1894. Serial No. 523,980. (No model.)

*To all whom it may concern:*

Be it known that I, JOHN M. GLASSMEYER, a citizen of the United States, residing at Wellston, in the county of St. Louis and State of Missouri, have invented certain new and useful Improvements in Cooking Utensils, of which the following is a specification, reference being had therein to the accompanying drawings.

This invention relates to a new and improved roasting and baking pan for household purposes; and it has for its objects to provide a very simple device by means of which meats may be continually and automatically basted during the roasting process, and to provide means whereby articles to be baked will be cooked evenly over all its exterior surface, as will be more fully hereinafter set forth.

The invention consists in the novel combination and arrangement of parts hereinafter fully set forth, and particularly pointed out in the claims appended.

In the drawings, Figure 1 is a perspective view showing the basting device in position; Fig. 2, a longitudinal sectional view thereof; Fig. 3, a sectional view of the pan arranged for baking; Figs. 4 and 5, detail views.

Referring to the various parts by numerals, 1 designates a baking pan of ordinary construction and of a suitable size. In the bottom of this pan is placed a rack 2, which rack consists of two longitudinal bars 3 which are connected by transverse bars 4. These transverse bars are bent down slightly at their ends, the main portion of the bars forming a slightly raised platform on which the article to be roasted is placed. These bars may be as close together as is found desirable.

Supported above the main pan 1 is a smaller pan or receptacle 5 which is designed to hold the basting and seasoning material. This pan has formed in its bottom a suitable number of perforations through which the basting material passes. This pan or receptacle is supported centrally over the main baking pan 1 in any suitable manner, but in the drawings I have shown the preferred form of support which consists of four adjustable legs pivotally secured to the outer sides of the pan 5, one at each corner thereof. These legs extend downwardly and when the receptacle is in position over the baking pan the lower end of each leg is placed in one of the corners of the main baking pan, as shown in Fig. 1. These adjustable legs each consists of two sections 6—6, one of said sections being pivoted to the receptacle 5 and having formed at its lower end an eye 7, the other one of said sections consisting of a straight bar having formed at its upper end an eye 8. The straight portion of the upper section passes through and binds against the eye 8 on the upper end of the lower section, and the straight portion of the lower section passes through and binds against the eye formed on the lower end of the upper section. It will thus be seen that when it is desired to adjust the legs it is necessary to simply slide the lower sections on the upper sections thereof, the frictional engagement at the eyes serving to securely hold the lower sections in their adjusted positions.

When it is desired to use the pan 1 for baking purposes the basting receptacle is removed therefrom and a perforated plate 9 is placed upon the rack 2. The article to be baked is placed upon the perforated plate, and by reason of the air space under the plate formed by the rack 2, its under side is cooked evenly with its top and outer sides.

It will be readily seen that by placing the perforated plate 9 on the slightly raised open platform formed by the rack 2 an air space is formed under the plate through which the hot air will circulate and thoroughly cook the under side of the article placed upon the plate without the least danger of burning it.

When the basting receptacle is removed from the roasting pan its supporting legs may be folded up, and by means of their pivotal connection with the receptacle they may be swung close to the sides of the receptacle. When folded in this manner the basting receptacle may be placed in the baking pan together with the plate 9 and the rack 2, the whole taking up only the space before occupied by the ordinary baking pan.

From the foregoing it will be readily understood that by the use of my device roasted meats may be constantly and automatically basted and the necessity for constant watchfulness during the roasting process is obviated. It will also be seen that as it will be unnecessary to open the oven door for the purpose of basting the roasting meats, a more steady and even temperature can be maintained in the oven and consequently the meats will be more evenly and quickly roasted.

I desire it understood that I do not limit myself to the exact form and construction of the parts shown and described as various changes may be made without departing from the scope of the invention.

It will be observed that the essential feature of the invention lies in so mounting the basting pan that it may be readily adjusted vertically to accommodate roasts of various sizes and also in order that its legs may be swung in or out to be firmly set in pans of all sizes and shapes. By the construction shown the basting pan may be tilted in any direction and adjusted laterally a limited distance if the character of the roast requires it.

Having thus fully described my invention, what I claim is—

1. A basting attachment for pans, consisting of a suitable perforated receptacle, means for removably supporting the receptacle over a suitable pan, said means consisting of legs pivoted at their upper ends to the perforated receptacle, whereby the lower ends of said legs may be swung out and be placed in the corners of pans of various sizes, substantially as described.

2. A basting attachment for pans consisting of a suitable perforated receptacle, means for removably supporting the receptacle over the pan, said means consisting of extensible legs pivoted to the receptacle at their upper ends their lower ends being adapted to be swung out and placed in the corners of pans of various sizes and shapes, substantially as described.

In testimony whereof I affix my signature in presence of two witnesses.

JOHN M. GLASSMEYER.

Witnesses:
 LIZZIE MORRISON,
 CALLA DORR.